United States Patent
Crocker

(10) Patent No.: US 7,022,008 B1
(45) Date of Patent: Apr. 4, 2006

(54) AIR DUCT SEAL FOR HVAC CASE

(75) Inventor: Glenn Crocker, Marietta, GA (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 11/030,549

(22) Filed: Jan. 6, 2005

(51) Int. Cl.
*B61D 27/00* (2006.01)

(52) U.S. Cl. .................. 454/69; 454/254; 454/903; 237/12.3 B

(58) Field of Classification Search ............ 454/69, 454/254, 270, 903
See application file for complete search history.

(56) References Cited

U.S. PATENT DOCUMENTS

| | | | | |
|---|---|---|---|---|
| 3,363,390 A | * | 1/1968 | Crane et al. ............ | 52/716.8 |
| 3,616,847 A | * | 11/1971 | Holmes ............... | 165/51 |
| 4,952,442 A | * | 8/1990 | Warner ............... | 428/83 |
| 5,344,603 A | * | 9/1994 | Jardin et al. ........... | 264/261 |
| 5,566,954 A | * | 10/1996 | Hahn ................. | 277/642 |

* cited by examiner

*Primary Examiner*—Derek S. Boles
(74) *Attorney, Agent, or Firm*—Harness, Dickey & Pierce, PLC

(57) ABSTRACT

An HVAC duct sealing system has an air duct wall, a sealing surface, such as an HVAC case, against which the air duct wall is biased, and a seal member interposed between the duct wall and the sealing surface. The seal member is interposed between the air duct wall and the sealing surface and is molded directly onto the air duct wall using a two-shot or double shot method of forming. The seal can be rubber or any flexible, pliable material capable of creating a seal with a surface. The seal has a seal base that is attached to and surrounds an end part and two sides of the air duct wall. The seal has a flexible tip portion extending from the seal base that is biased against and bends against the sealing surface in accordance with an amount of pressing force to create a seal. The flexible tip bends between 0 and 100 degrees from its pre-installation position.

17 Claims, 6 Drawing Sheets

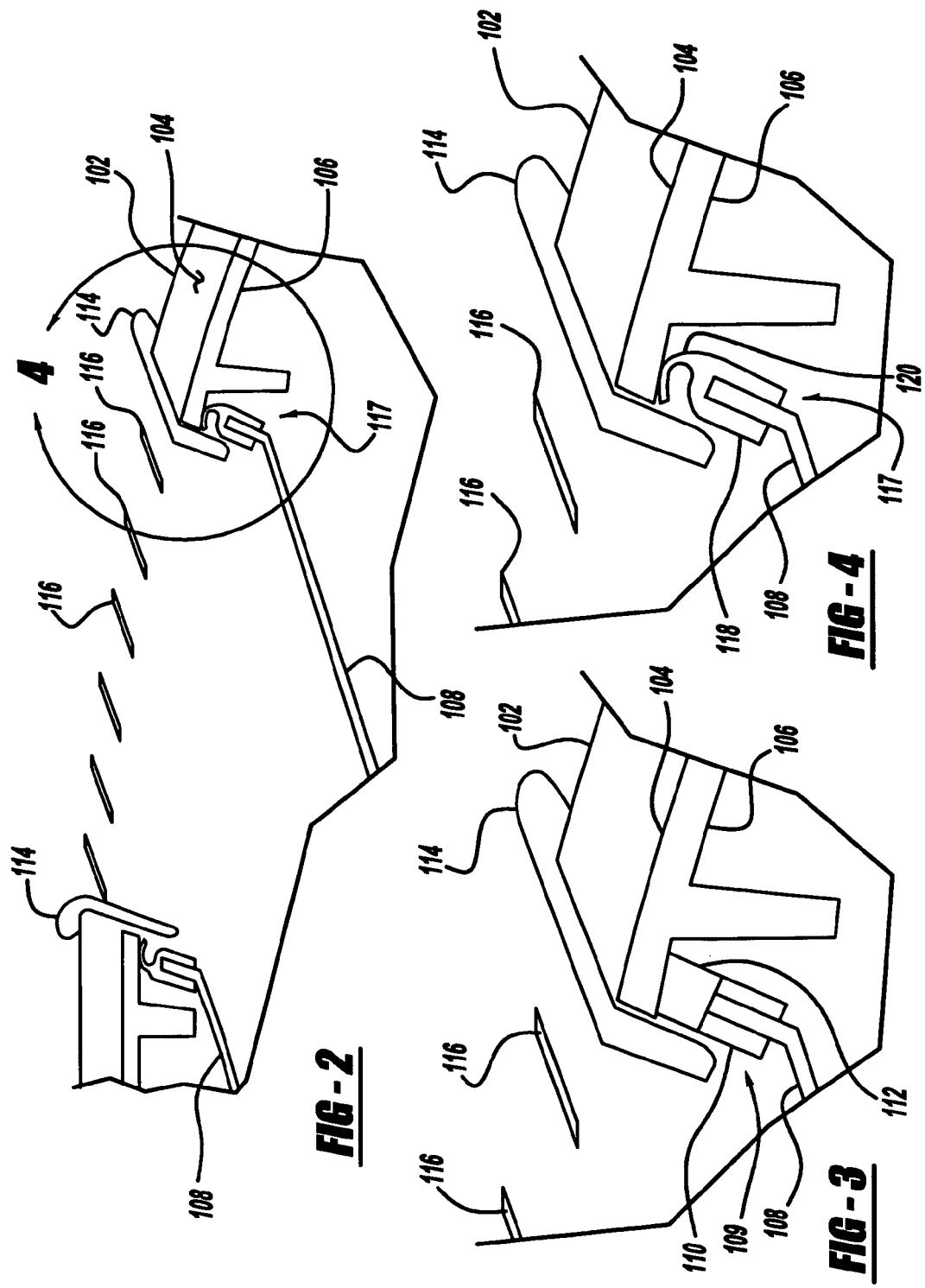

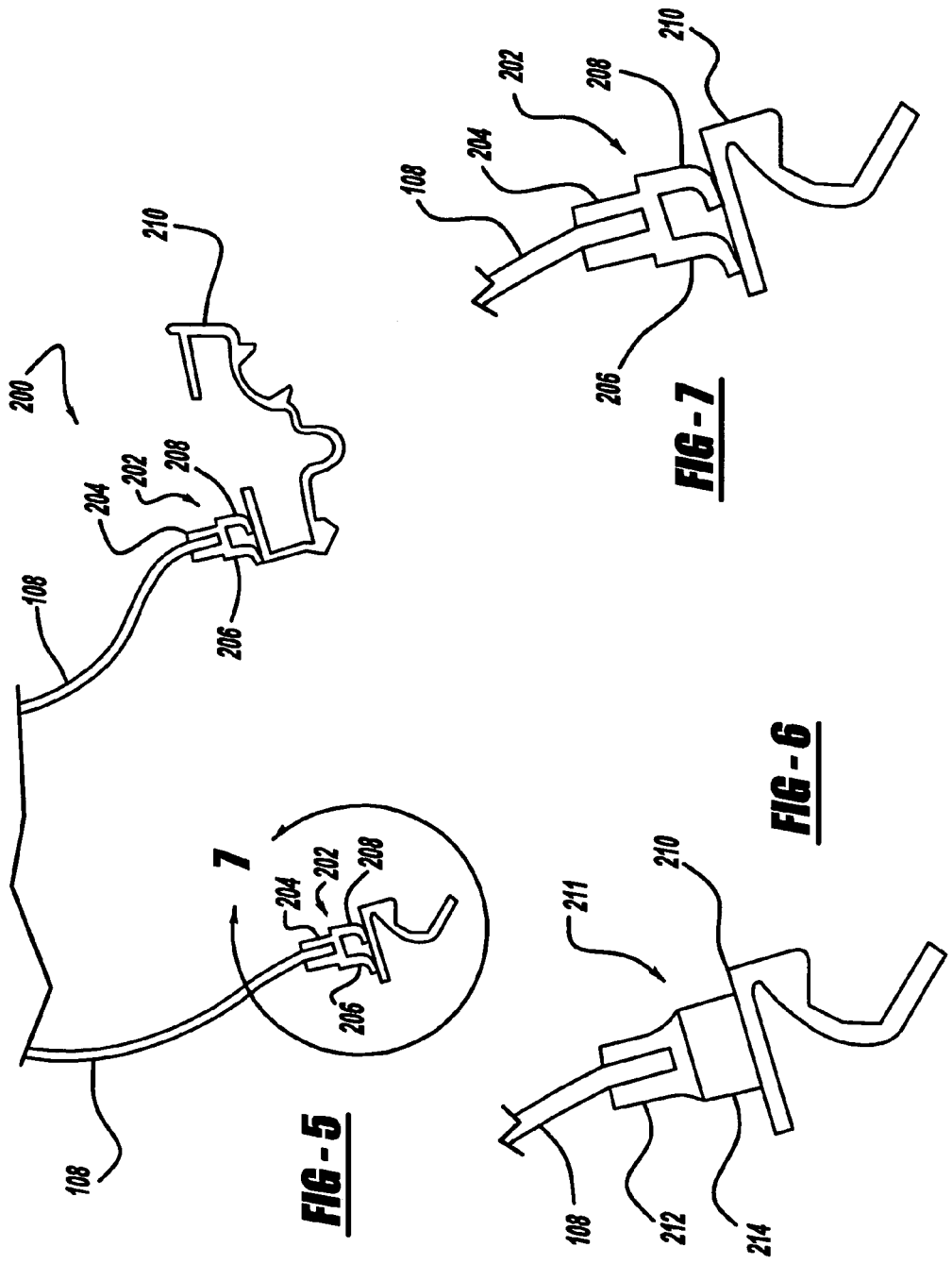

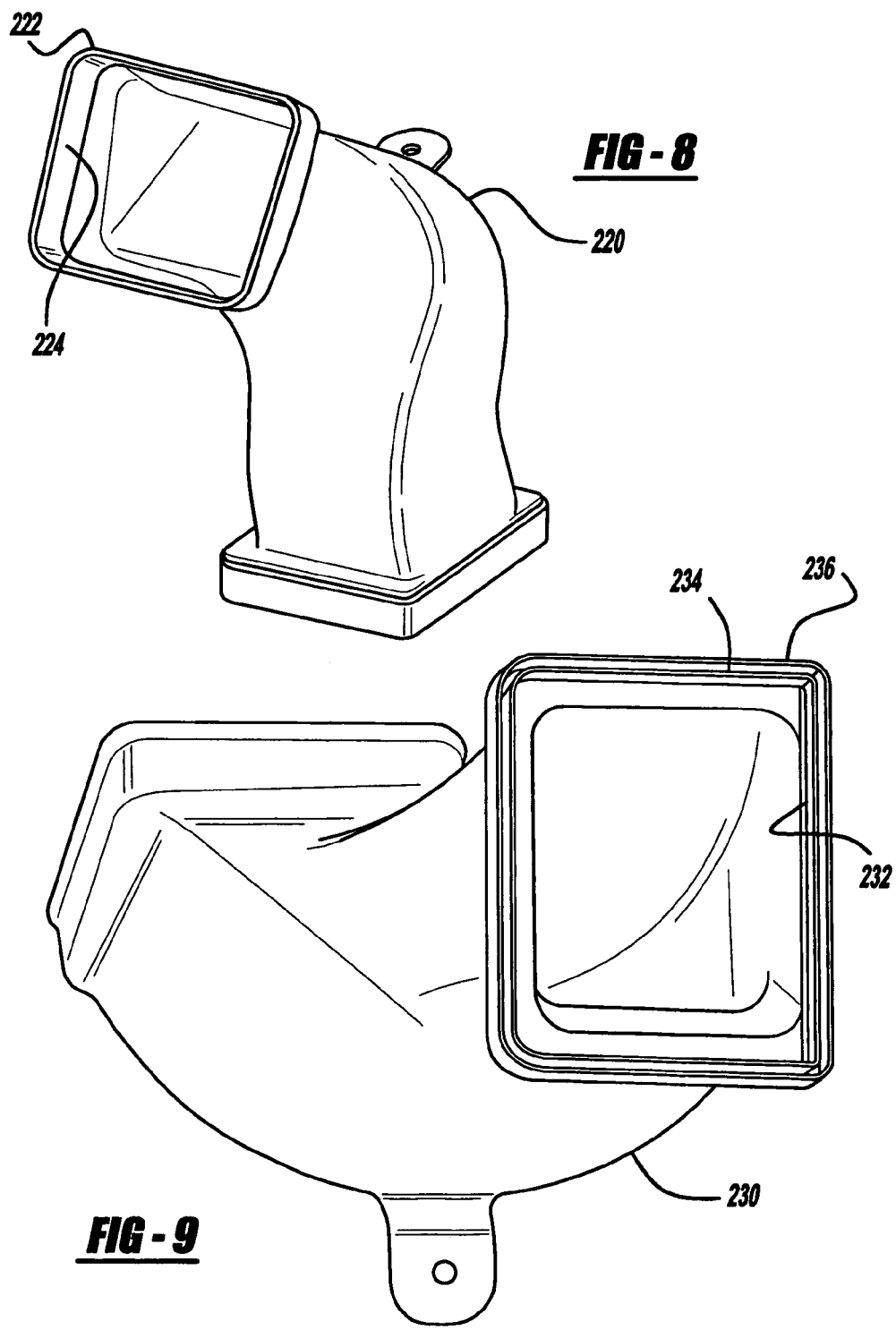

AIR DUCT SEAL FOR HVAC CASE

FIELD OF THE INVENTION

The present invention relates to vehicular air duct seals, and more particularly to air duct seals on air ducts that abut an HVAC case and an air outlet device.

BACKGROUND OF THE INVENTION

In recent years, manufacturers and suppliers of heating ventilating and air-conditioning (HVAC) equipment for automobiles have invoked initiatives aimed at increasing the efficiency of air-conditioning systems. Specifically, one area that is the subject of an initiative is preserving and improving the seals between ductwork and casing utilized in the routing of air through the air-conditioning system. An improvement in the seals, connections and ductwork of the HVAC system results in improved efficiency of the air-conditioning systems.

Foam is a traditional material used to connect ductwork pieces together and to connect ductwork to HVAC cases and air outlets. That is, foam is used as a sealing agent with the intention of creating a leak-proof seal between any duct parts, whether it be foam against foam or foam against a plastic or metal duct, foam with at least one adhesive side is used. FIG. 1 is a view of a prior art example of a duct 10 that interfaces with an HVAC case 16. The contact of the duct wall 12 and the HVAC case 16 is interposed with a piece of foam 18. The duct rim 14 is pressed into the compressible foam 18 in order to seal the interior duct passage 20 from any leaks at such interface. However, this method is not without its share of problems. For instance, typically during installation, the duct 10 and duct wall 12 are inserted into an area that cannot be seen by the installer, which causes the duct wall 12 to approach the foam 18 at an angle or in such a way as to tear the foam 18. Since the foam 18 can not be seen by the installer, the tear remains, worsens with vibration and movement of the automobile with the passage of time, and eventually air is able to leak from the interior duct passage 20 causing the overall efficiency of the HVAC system to decrease.

Another situation that causes the deterioration of the foam 18 is the mere passage of time. Historically, foam breaks down and deteriorates with the passage of time, thus resulting in looser seals between mating parts that eventually results in the leaking of air where around the foam 18. Still yet another disadvantage results when, during alignment or installation of the duct, the foam is pushed out of position, unbeknownst to the installer. When this occurs, no seal or a seal that is easily blown out of position results between the mating parts and eventually results in the leaking of air where the foam 18 resides.

Regardless of the cause, the leaking of air results in lower blowing force and lower blowing volume into the automobile cabin. This causes air-conditioning compressors to operate longer and at higher compressor displacements than if there was no leaking at the foam interfaces. This results in poor overall efficiency of an afflicted air-conditioning system. What is needed then is a method of sealing that does not suffer from the above disadvantages.

The continued development of air-conditioning systems has been directed to seals between ductwork of whatever fashion to reduce and/or eliminate misalignment, tearing of foam, or the pushing of foam out of the interface between mating surfaces.

SUMMARY OF THE INVENTION

The present invention provides the art with an improved sealing structure for use in sealing joints of an HVAC case, or for sealing an HVAC duct wall and a sealing surface such as an instrument panel or a dash panel. In one embodiment an air duct wall has a seal, which can be attached to the duct wall in a two-shot or double-shot manufacturing process, that biases or bends in a fold over fashion against a sealing surface such as an HVAC case or adjoining duct. In the first embodiment, the seal is a single finger-like protrusion that bends when it contacts a surface to seal. In another embodiment of the present invention, the seal has two fingers that protrude from the base seal. In this embodiment, two seals are formed between the seal and the surface against which it is forced in order to create an airtight seal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a cross-sectional view of a side window defroster duct that depicts the sealing of the duct seals with the dash panel;

FIG. 3 is an enlarged cross-sectional view depicting a seal of the defroster duct against the dash panel according to the teachings of the present invention;

FIG. 4 is an enlarged cross-sectional view depicting a seal of the defroster duct against the dash panel according to the teachings of the present invention;

FIG. 5 is a cross-sectional view depicting a seal between an HVAC case and face duct according to the teachings of the present invention;

FIG. 6 is an enlarged cross-sectional view depicting a duct seal according to the teachings of the present invention;

FIG. 7 is an enlarged cross-sectional view that depicts the interface between the duct seal and the HVAC case according to the teachings of the present invention;

FIG. 8 is a perspective view of an HVAC duct depicting a single seal at an end of the duct;

FIG. 9 is a perspective view of an HVAC duct depicting a double seal at an end of the duct;

DETAILED DESCRIPTION OF THE PREFERRED EMBODIMENTS

Figure 1:
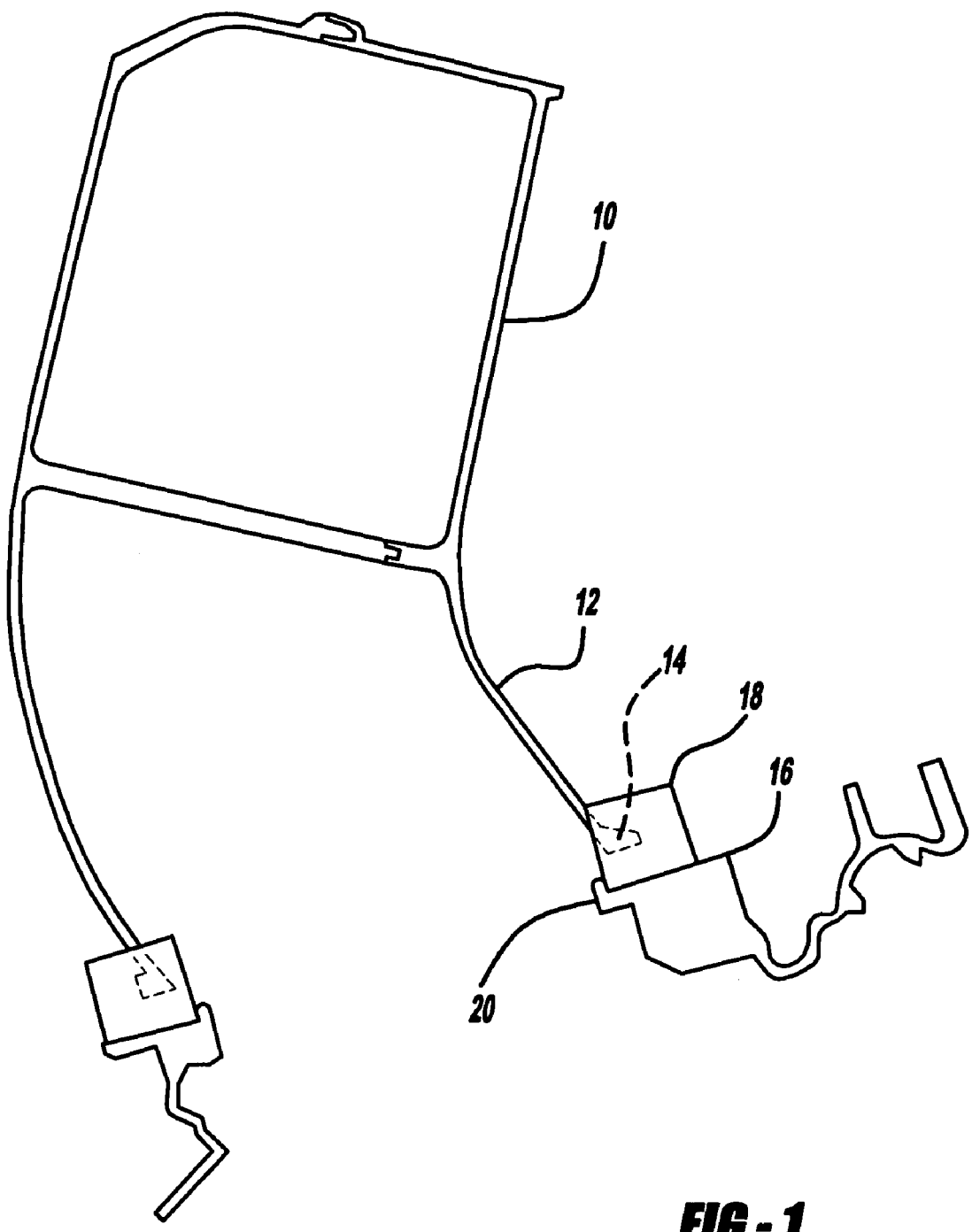
FIG. 1 is a cross-sectional view of an HVAC duct showing how a duct opening interfaces with a foam seal of the prior art.

The following description of the preferred embodiments is merely exemplary in nature and is in no way intended to limit the invention, its application, or uses. The operative workings of the present invention will be described using FIGS. 2 through 11, while FIG. 12 provides a perspective view of an automobile 30 showing the general location of an engine with air-conditioning system 32 and an air-conditioning duct 108.

FIG. 2 is a cross-sectional view of a side window defroster outlet 100, which utilizes multiple parts, some of which are used to form a seal. In FIG. 2, the instrument panel (IP) 102 is retained or held in position by the instrument panel retainer (IPR) 114. The instrument panel 102 is constructed of a hard plastic or composite carrier 106 with an overlay of a soft cover 104 such that the soft cover 104 faces a user who occupies the front passenger seat in the passenger compartment of an automobile. The HVAC duct 108 interfaces with the instrument panel 102 using a seal 109, 117. That is, in FIGS. 2 and 4 it is the seal 117 that contacts the instrument panel 102 to form a seal, and in FIG. 3, it is the seal 109 that contacts the instrument panel 102 to form a seal. Each seal 109, 117 is constructed of a seal base and a flexible and/or compressible seal tip as depicted in FIGS. 2–4. With more specific reference to FIG. 3, the seal tip 112 is nearly the same size and shape as the seal base 110. In FIG. 3, the seal tip 112 compresses upon itself when force is applied to the seal tip 112 using the HVAC duct 108.

FIG. 4, which is an enlarged view of a portion of FIG. 2, depicts a seal 117, having a seal base 118 with a flexible seal tip 120, also known as a seal finger, according to teachings of the present invention. As depicted in FIG. 4, the flexible seal tip 120 is able to bias against the instrument panel 102 when the instrument panel 102 is put into place or when the HVAC duct 108 is placed against the instrument panel 102. The instrument panel retainer 114 is located adjacent to a plurality of louvers 116, which are positioned over the opening of the HVAC duct 108. The instrument panel retainer 114 acts as an aesthetic cover to the end of the instrument panel 102. The HVAC duct 108 is used to direct air of various temperatures through the louvers 116 and into the passenger compartment of a vehicle 30.

FIG. 5 is a cross-sectional view depicting an HVAC case and face duct of a third embodiment according to the teachings of the present invention. FIG. 5 depicts the HVAC duct 108 interfacing with an HVAC case 210. In this particular embodiment, the seal 202 is constructed of a seal base 204 and a dual-fingered seal tip 206, 208, more specifically, constructed of an interior seal tip 206 and an exterior seal tip 208. Both seal tips 206, 208 are flexible fingers that are deformable in order to create a seal against the HVAC case 210. Because the seal tips 206, 208 possess a restoring force, they maintain a biased position against the HVAC case 210. The seal base 204 is, as in prior examples, molded around the HVAC case 108 end so that the seal base 204 is equally, or rather, symmetrically positioned on the HVAC case 108 end.

FIG. 7 is an enlarged depiction of the HVAC duct 108 and its accompanying seal 202 against the HVAC case 210 surface. As depicted, the fingers 206, 208 bias inwardly toward the interior of the HVAC duct 108; however, the interior seal tip 206 and the exterior seal tip 208 may also be situated such that they are able to bias outwardly, that is, to point in a direction away from the HVAC duct 108. In yet another example, not shown, the seal tips 206, 208 may merely touch the HVAC case 210 without biasing to either side with respect to their longitudinal center lines. In this instance, the seal tips 206, 208 would form a seal merely by contacting the HVAC case. This is another advantage to this fingered seal arrangement, that is, due to installment inconsistencies or slight product variations, the seal tips 206, 208 may contact the HVAC case 210 to a small or large degree. In the sealing arrangement depicted in FIG. 5 and FIG. 7, a dual seal is created between the HVAC duct 108 and the HVAC case 210 because of the fingers 206, 208. This arrangement ensures detainment of the air that passes through the HVAC duct 108. More specifically, this arrangement ensures that most or all of the air that travels within the duct, passes into the cabin of the vehicle 30.

FIG. 6 depicts a single seal arrangement in which the seal 211, constructed of a seal base 212 and a solid seal tip 214, interfaces against the HVAC case 210. In this preferred embodiment, the solid seal tip 214 is presented with a force that is coincident with the longitudinal axis of the HVAC case 108 in order to bias or compress the solid tip seal 214 axially against the HVAC duct 108. This ensures a consistent and equilateral seal against the HVAC case 210. That is, the HVAC duct 108 is directed through the center of the seal base 212 and seal tip 214.

FIGS. 8 and 9 are representative examples of how the HVAC sealing system is situated on the HVAC duct in a respective figure. For example, FIG. 8 depicts an HVAC duct 220 in which the solid seal tip 222 is situated on an end of the HVAC duct 220, thereby forming an outlet 224 of HVAC duct 220. It is also possible that the HVAC outlet 224 may also be an inlet depending upon how the HVAC duct 220 is situated, that is, whether it is accepting air or discharging air. Regardless of how the air is transferred, the solid seal tip 222 of FIG. 8 forms a single seal against its abutting structure, as opposed to the double seal depicted in FIG. 9. When the seal depicted in FIG. 8 is abutted against its adjacent structure, a seal such as that shown in FIG. 3 is formed.

FIG. 9 depicts an HVAC duct 230 that has an outlet 232, which may also be an inlet, on which a double seal constructed of an interior duct seal 234 and an exterior duct seal 236. When this sealing structure abuts against its adjacent structure, a double seal is formed such as the seal depicted in FIGS. 5 and 7. The dual seal, as depicted in FIG. 9, is similar to the single biased seal shown in FIGS. 2 and 4, except that the seal depicted in FIG. 9 is a dual biased seal.

Figure 10:
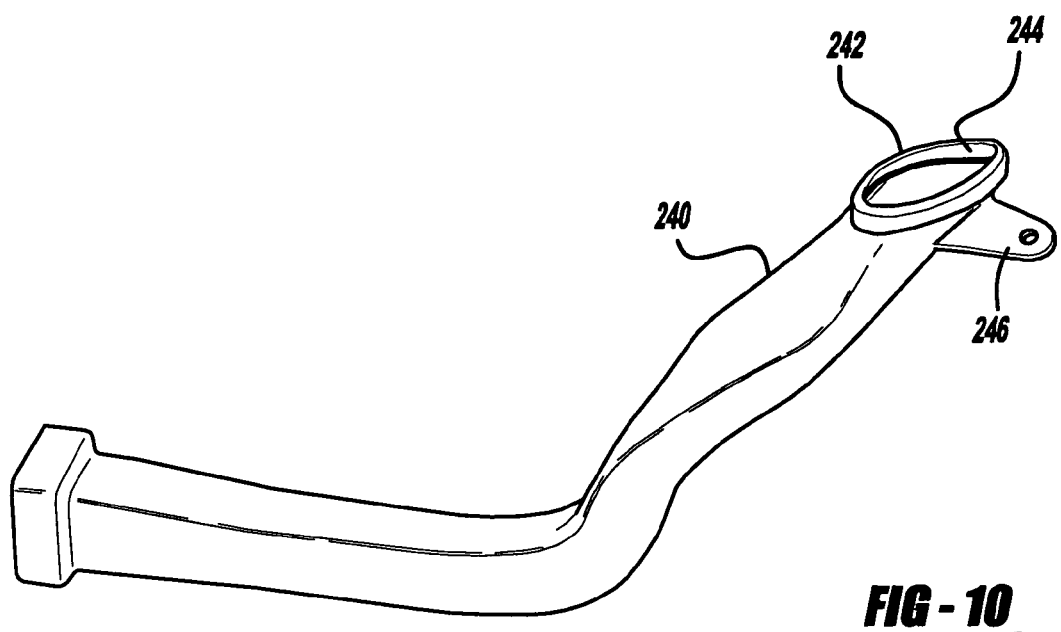
FIG. 10 is a perspective view of an HVAC duct depicting the contour of the duct and a seal at an end of the duct.
Figure 11:
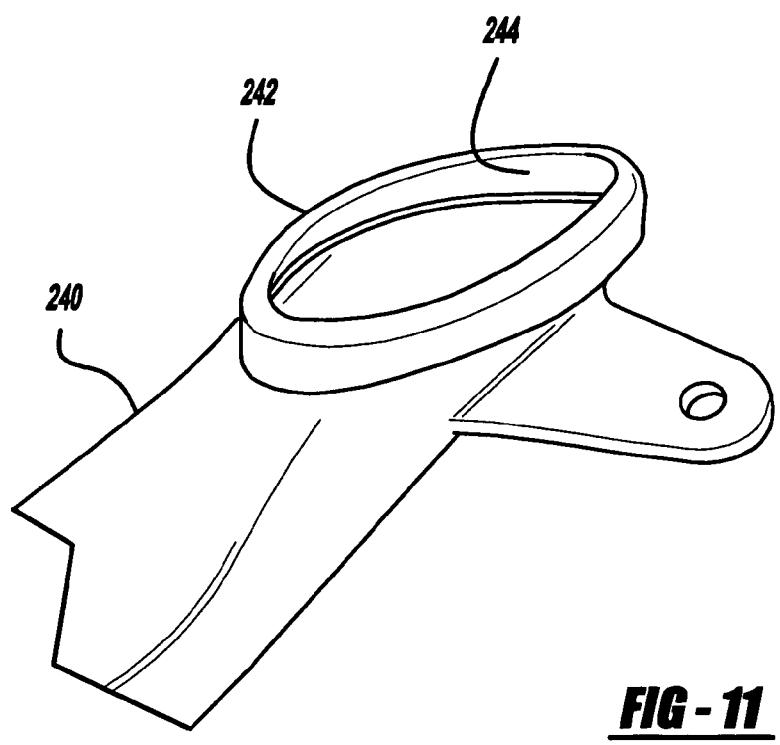
FIG. 11 is an enlarged view of a sealing end of the duct depicted in FIG. 10, detailing the periphery of the duct seal.
Figure 12:
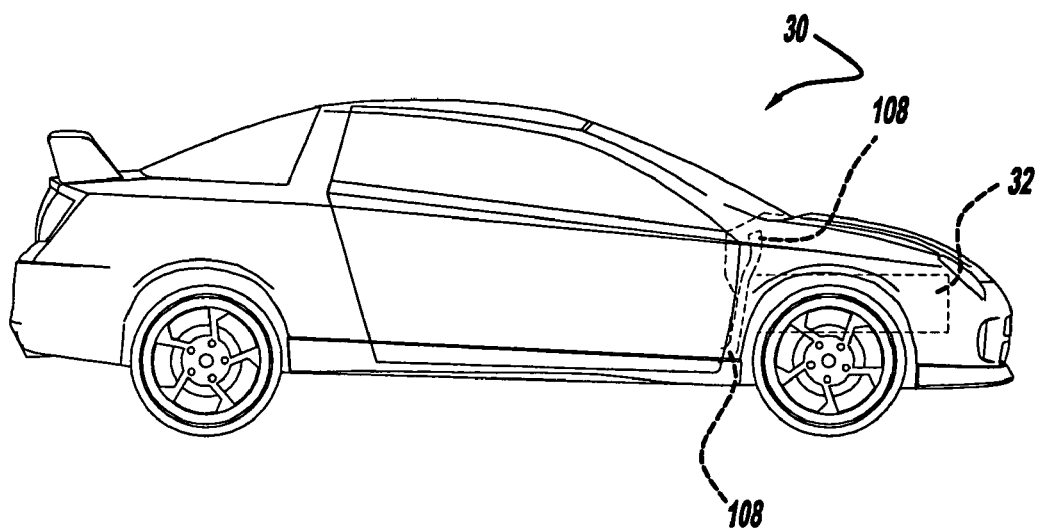
FIG. 12 is a perspective view of an automobile in which an air-conditioning system and accompanying ductwork are installed according to the teachings of the present invention.

FIGS. 10 and 11 depict an HVAC duct 240 that forms an outlet 244, which potentially could also be an inlet, upon which a seal 242 resides. FIGS. 10 and 11 also depict a flange 246 that is used to mount the duct 240. FIG. 11 is an enlarged view of the end of the HVAC duct 240. The seal 242 is similar to that depicted in FIG. 3, that is, it is not a single or dual fingered seal, but rather a single piece of compressible material. For all of the seals shown in all of the Figures, the materials of the seals may vary. The materials may be a pliable, flexible rubber or plastic. Alternatively, they may be a hard, but thin, pliable plastic.

Therefore an air duct seal is provided that has an interior seal portion and an exterior seal portion such that the interior and exterior portions are located on opposite sides of an air duct wall. The air duct seal has a first protruding potion that protrudes away from the interior and exterior seal portions. The first protruding portion is a seal-forming portion that is used to seal against an adjacent sealing surface. The exterior seal portion and interior seal portion of the air duct seal are securing portions that are molded to the air duct wall and secure the air duct seal to the air duct wall.

The first protruding portion is a flexible tip portion that is biased against the sealing surface by a force supplied by its own structure, that is, the first protruding portion is a structure that possesses a restoring force that causes the first protruding portion to constantly bias itself toward its originally molded position as shown in FIG. 8. The flexible tip bends in accordance with an amount of force applied against it by the sealing surface and may bend anywhere between 0 and 110 degrees with respect to its straight protruding position coincident with or parallel to the longitudinal axis of the HVAC duct. The flexible tip portion may be a multi-tipped portion to provide multiple seals against its sealing surface. The air duct seal may be applied to the air duct wall using a double-shot molding method. The protruding portion is a flexible tip portion that may be thinner than the overall combined thickness of the interior seal portion, exterior seal portion, and air duct wall. Alternatively, the protruding portion may be a flexible tip portion having a thickness equal to an overall combined thickness of the interior seal portion, exterior seal portion, and air duct wall. In yet another variation the protruding portion is a compressible tip portion that is compressible upon itself, that is, it does not bend.

The flexible protruding portion is shown off-center in cross-section in FIGS. 2, 4, 5 and 7 with respect to the air duct wall that it is attached to, however, these are not the only variations possible. In another variation, the flexible protruding portion may be located directly beyond, that is, above the air duct wall.

There are many advantages of the seals depicted in FIGS. 2–11. All of the seals provide a more durable and longer-lasting seal over traditional porous foam seals. Additionally, the seals 109, 117 and 202 are capable of sealing even if the HVAC duct 108, which each is molded to, is placed within a "reasonable installation distance" from its accompanying HVAC case. Usually, this reasonable installation distance will be from 0 to 3 centimeters. That is, with the seals of the present invention, the advantage is that the HVAC duct walls, possessing a seal, do not have to be perfectly aligned with an accompanying HVAC case. Another advantage is that the seals are flexible and will slide or move on their respective HVAC case when the vehicle in which they are installed, moves over rough terrain, or is subject to normal vibrations, both of which may tear a traditional seal.

The manufacturing method by which the seals of FIGS. 2–11 may be made is known as a double-shot molding process. This is a manufacturing process normally employed for the production of dual-colored or dual-component parts. In this process successive molding methods are used to obtain the dual colors or dual components. The basic process includes injection molding a first part, transferring this first part to a second mold as an insert, and then molding the second component against or to the first part. This process is known by other terminology that includes two-shot molding, insert molding, dual or two-color molding and over-molding.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An air duct seal comprising:
   an interior seal portion;
   an exterior seal portion, wherein the interior and exterior seal portions are located on opposite sides of an air duct wall; and
   a first protruding portion that protrudes away from the interior and exterior seal portions and which includes a laterally extending end face, the laterally extending end face being adapted to contact an adjacent sealing face to deflect the first protruding portion, wherein the first protruding portion is a seal forming portion that is used to seal against the adjacent sealing surface.

2. The air duct seal of claim 1, wherein the exterior seal portion and interior seal portion are securing portions that secure the air duct seal to the air duct wall.

3. The air duct seal of claim 2, wherein the exterior seal portion and interior seal portion are molded to the air duct wall.

4. The air duct seal of claim 3, wherein the first protruding portion is a flexible tip portion, which biases in one of two lateral directions relative to its length, and that is biased against the sealing surface by a force supplied by its own structure.

5. The air duct seal of claim 4, further comprising a second protruding portion parallel to the first protruding portion to provide multiple seals against the sealing surface.

6. The air duct seal of claim 4, wherein the flexible tip bends between 30 and 100 degrees from its pre-installation position.

7. The air duct seal of claim 1, wherein the sealing surface is a surface of an instrument panel.

8. The air duct seal of claim 1, wherein the air duct seal is applied to the air duct wall using a double-shot molding method.

9. An air duct seal comprising:
   an interior seal portion;
   an exterior seal portion, wherein the interior and exterior seal portions are located on opposite sides of an air duct wall; and
   a protruding portion that protrudes away from the interior and exterior seal portions, wherein the protruding portion is a compressible seal forming portion that is compressible upon itself and that is used to seal against an adjacent sealing surface, wherein the exterior seal portion and interior seal portion are securing portions that secure the air duct seal to the air duct wall using a double-shot attachment method, wherein the protruding portion is a flexible tip portion having a thickness equal to an overall combined thickness of the interior seal portion, exterior seal portion, and air duct wall.

10. The air duct seal of claim 9, wherein the protruding portion is a flexible tip portion that is thinner than the overall combined thickness of the interior seal portion, exterior seal portion, and air duct wall.

11. The air duct seal of claim 10, wherein said flexible tip bends in accordance with an amount of force applied against it by the sealing surface.

12. The air duct seal of claim 11, wherein the flexible tip bends between 30 and 100 degrees from its pre-installation position.

13. The air duct seal of claim 12, wherein the sealing surface is a surface of an instrument panel.

14. The air duct seal of claim 10, wherein the flexible tip portion is a multi-tipped portion to provide multiple seals against the sealing surface.

15. A vehicular HVAC air duct sealing apparatus, the sealing apparatus comprising a double-shot molded flexible seal upon an end of an air duct wall, the flexible seal including a laterally extending end face, the laterally extending end face being adapted to contact an adjacent sealing face to deflect the flexible seal in one of two directions upon said contact, the flexible seal protruding from the end of the air duct wall and bending in accordance with an amount of force applied to the flexible seal by a sealing surface, wherein the protruding flexible seal is located apart from the air duct wall.

16. The vehicular HVAC air duct sealing apparatus of claim 15, wherein the protruding flexible seal is located off-center in cross-section with respect to the air duct wall longitudinal axis.

17. The vehicular air duct sealing apparatus of claim 16, further comprising a second flexible protruding seal.

* * * * *